(12) United States Patent
Schilling

(10) Patent No.: US 8,829,761 B2
(45) Date of Patent: Sep. 9, 2014

(54) SLIDING CONTACT ASSEMBLY WITH DUST REMOVAL

(75) Inventor: Harry Schilling, Eichstaett (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 1429 days.

(21) Appl. No.: 11/559,756

(22) Filed: Nov. 14, 2006

(65) Prior Publication Data

US 2008/0111440 A1    May 15, 2008

(51) Int. Cl.
*H02K 13/10* (2006.01)
*H01R 39/48* (2006.01)
*H02K 9/28* (2006.01)

(52) U.S. Cl.
CPC . *H01R 39/48* (2013.01); *H02K 9/28* (2013.01)
USPC .......................................... 310/232; 310/239

(58) Field of Classification Search
CPC .................................. H02K 9/28; H02K 13/10
USPC ...................................... 310/219, 228; 29/597
IPC ...................... H02K 13/00; H01R 43/06, 43/10
See application file for complete search history.

(56) References Cited

U.S. PATENT DOCUMENTS

| | | | |
|---|---|---|---|
| 2,106,842 A * | 2/1938 | Hague et al. ................... | 310/178 |
| 2,745,976 A * | 5/1956 | Martin et al. ................... | 310/228 |
| 4,186,321 A * | 1/1980 | Marshall ........................ | 310/178 |
| 4,476,410 A * | 10/1984 | Wolcott ......................... | 310/228 |
| 4,966,555 A | 10/1990 | Zagorski | |
| 5,296,772 A | 3/1994 | Bradfield et al. | |
| 6,707,217 B1 * | 3/2004 | Zwarg et al. ................... | 310/228 |
| 7,102,266 B2 * | 9/2006 | Coles ............................. | 310/239 |
| 2002/0047470 A1 | 4/2002 | Shioya et al. | |
| 2004/0100159 A1 | 5/2004 | Rehder et al. | |
| 2005/0193696 A1 * | 9/2005 | Muller et al. .................... | 55/486 |
| 2006/0067615 A1 * | 3/2006 | Schilling et al. ................ | 385/25 |
| 2006/0175925 A1 | 8/2006 | Coles | |
| 2007/0032099 A1 * | 2/2007 | Schilling ........................ | 439/13 |

FOREIGN PATENT DOCUMENTS

| | | |
|---|---|---|
| CN | 1350714 A | 5/2002 |
| DE | 19543383 | 5/1997 |
| JP | 59172954 A * | 9/1984 |
| JP | 61-123652 U | 8/1986 |
| JP | 61-176966 U | 11/1986 |
| JP | 63-179684 U | 11/1988 |

(Continued)

*Primary Examiner* — Michael Andrews
(74) *Attorney, Agent, or Firm* — Kevin L. Daffer; Daffer McDaniel LLP

(57) ABSTRACT

A sliding contact assembly comprises: at least one contact slide track; a brush holder for holding at least one brush contact member and maintaining the at least one brush contact member in sliding contact with the at least one contact slide track during relative movement between the brush contact member and the contact slide track; and a collecting container disposed to collect particles of abraded material from the at least one brush contact member; wherein a cover is provided to surround substantially the brush holder and the at least one brush contact member, the cover having walls extending along a direction of the contact slide track laterally of the brush holder and the brush contact member and along a side of the brush holder remote from the contact slide track; the collecting container is disposed at a downstream end of the cover; and the cover is designed to channel a stream of air, generated within the cover by movement of the contact slide track, towards the collecting container.

18 Claims, 2 Drawing Sheets

(56) References Cited

FOREIGN PATENT DOCUMENTS

| | | | |
|---|---|---|---|
| JP | 5-76525 A | | 3/1993 |
| JP | 6005340 | | 1/1994 |
| JP | 2002136036 A | * | 5/2002 |
| WO | 00/69049 A2 | | 11/2000 |
| WO | WO 2005078872 A1 | * | 8/2005 |

* cited by examiner

SLIDING CONTACT ASSEMBLY WITH DUST REMOVAL

BACKGROUND OF THE INVENTION

1. Field of the Invention

The present invention relates to a sliding contact assembly and, in particular, to a system for collecting particles of abraded matter formed by the movement of a brush contact member along a contact slide track.

Sliding contact assemblies are used in apparatus to maintain electrical contact between two mechanically separate parts that are adapted to move relative to each other, where leads cannot be employed. One of the parts is provided with an extended contact track and the other of the parts is provided with a sliding contact member adapted to move relative to the contact track whilst maintaining an electrical contact with the track. Parts connected by sliding contact assemblies may move linearly or rotate relative to each other.

Sliding contact assemblies are used as components of known slip-ring systems where an electrical contact is maintained between a rotatably supported circular or annular contact track and a brush contact member adapted to slide along the track. The systems may be used for transmission of electrical signals, or for mere transmission of electrical energy.

The term brush contact member is here used to denote any sliding brush-shaped, wire-shaped, rod-shaped, or pin-shaped contact member that may be made of metal, conducting plastic material, carbon material, or any other material known in prior art for this purpose. Mechanical movement between the contact slide track and the brush contact member causes friction and so-called brush wear owing to an abrasion of small particles of electrically conducting contact material. These particles form fine dust that is scattered into the surroundings and deposited on other components including any insulating material surrounding the contacts. This may cause an appreciable deterioration of insulating properties and in turn may lead to short circuits or an erosion and burning away of the insulating material. Damage may be prevented by regular maintenance of sliding contacts assemblies, involving a careful removal of deposited material from various components, but some particular applications necessitate long periods of operation before maintenance becomes possible.

2. Description of the Prior Art

A slip-ring system for computer tomographs is disclosed in JP 06005340. Transmission of electrical energy is effected by means of a brush running along a ring. A separately disposed dust-collecting device comprises a collector for dust and a tube through which the dust is removed by suction.

A slip ring system for computer tomographs, as described in DE 195 43 383 B4, comprises a slip-ring contact track, and a brush holder and a contact brush adapted to slide along the contact track to form a sliding contact. The system further comprises at least one collecting device for capturing abraded particles that are formed during the movement. The collecting device is adapted to be electrostatically charged, so that captured abraded particles are retained in the collecting device by electrostatic forces.

BRIEF SUMMARY OF THE INVENTION

It is the object of the present invention to provide a sliding contact assembly comprising a contact slide track and a brush contact member with means for efficiently removing and collecting particles of matter abraded from the brush contact member, in order to reduce contamination of surrounding components by deposits of conducting material and thereby to reduce the frequency of necessary maintenance work on the sliding contact assembly.

In accordance with the present invention this object is achieved by a sliding contact assembly comprising: at least one contact slide track; a brush holder for holding at least one brush contact member and maintaining the at least one brush contact member in sliding contact with the at least one contact slide track during relative movement between the brush contact member and the contact slide track; and a collecting container disposed to collect particles of abraded material from the at least one brush contact member; wherein a cover is provided to surround substantially the brush holder and the at least one brush contact member, the cover having walls extending along a direction of the contact slide track laterally of the brush holder and the brush contact member and along a side of the brush holder remote from the contact slide track; the collecting container is disposed at a downstream end of the cover; and the cover is designed to channel a stream of air, generated within the cover by movement of the contact slide track, towards the collecting container.

The invention will be further illustrated with the aid of drawings which, although not to scale, schematically show non-limiting examples of embodiment.

DETAILED DESCRIPTION OF PREFERRED EMBODIMENTS

Figure 1:
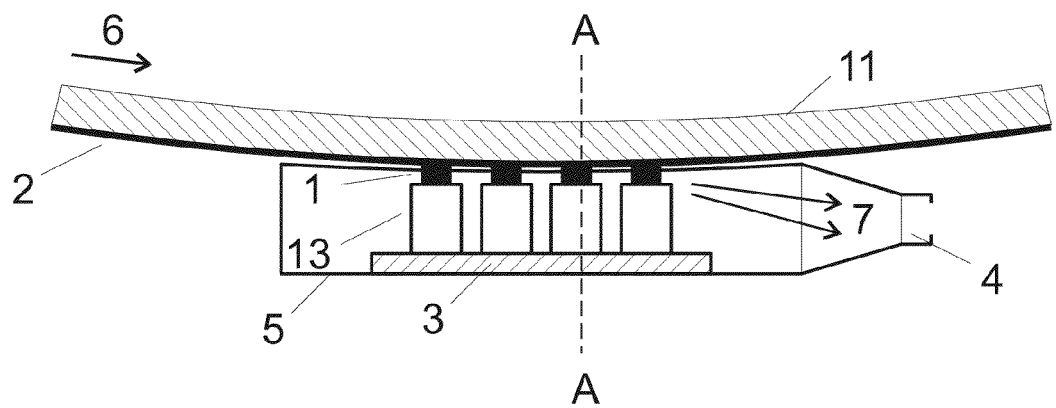
FIG. 1 shows a longitudinal cross section through an embodiment of a sliding contact assembly used in a slip-ring, wherein the sliding contact assembly comprises a cover and collecting chamber for collecting particles.

Embodiments of a sliding contact assembly used within a slip-ring system are shown in FIGS. 1-4. In the sectional view of FIG. 1, four brush contact members 1, each supported in a sleeve 13, are disposed in a row and supported in a brush holder 3. The brush contact members 1 are maintained in sliding contact with a sliding contact track 2 disposed on a support 11 that moves in a direction indicated by an arrow 6. A cover 5 is provided for substantially surrounding the brush holder 3 and the brush contact members 1. The cover 5 has walls extending along a direction of the contact track 2 laterally of the brush holder 3 and the brush contact members 1 and along the side of the brush holder 3 remote from the contact track 2. A collecting container 4 for particles of material abraded from the brush contact members 1 is disposed downstream of the brush holder 3 and the brush contact members 1 at a downstream end face of the cover 5.

As described in more detail below, the cover 5 is designed as an air-guiding channel to guide an air stream caused by movement of the contact track 2 and carrying particles of material abraded from the brush contact members 1 along the direction of arrows 7 into the collecting container 4.

Figure 2:
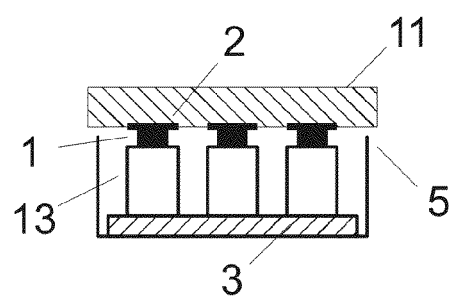
FIG. 2 shows a transverse cross section along the line A-A of FIG. 1, as seen from the left-hand end of the sliding contact assembly shown in FIG. 1.

FIG. 2 is a view of a transverse cross-section through the sliding contact assembly of the present invention along the line A-A of FIG. 1, as seen from the left- and side of FIG. 1. Shown are three sliding contact tracks 2 mounted to be adjacent to each other on the support 11, and a brush contact member 1 maintained in sliding contact with each of the sliding contact tracks 2. Thus, the brush holder 3 accommodates three rows of brush contact members 1, each row comprising four brush contact members 1. The walls of the cover 5 are spaced in a lateral direction from the brush holder 3 and the brush contact members 1, and extend laterally of the brush holder 3 and the brush contact members 1 and along the side of the brush holder 3 remote from the contact tracks.

Figure 3:
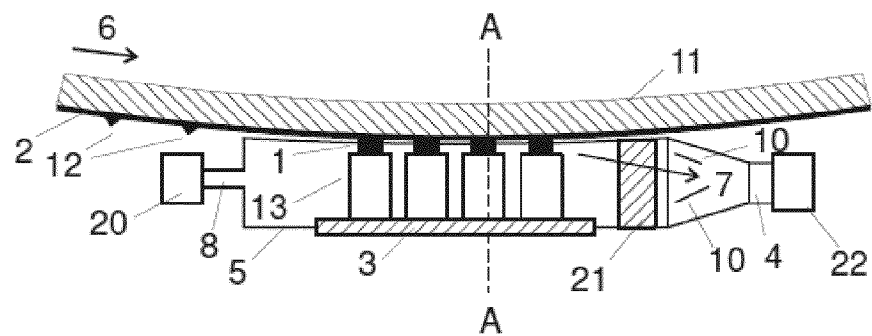
FIG. 3 shows a longitudinal cross section through another embodiment of a sliding contact assembly used in a slip-ring, wherein the cover is fitted with a pressurized air supply pipe and air-guiding plates.

FIG. 3 shows a view similar to that of FIG. 1 of another embodiment of a sliding contact assembly used in a slip-ring. Components denoted with similar reference numerals will not be described further herein for purposes of brevity. In the embodiment of FIG. 3, an upstream end face of the cover 5 is closed, but fitted with a supply pipe 8 for introducing pressurized air into the cover at the upstream end. The brush holder 3 is integrated into the cover 5 shown in FIG. 3, instead of surrounded by the cover 5, as shown in FIG. 1. The collecting chamber 4 shown in FIG. 3 is fitted with a filter medium (contained, e.g., within block 22) for trapping particles of material abraded from the brush contact members 1 while allowing passage of air there through.

Figure 4:
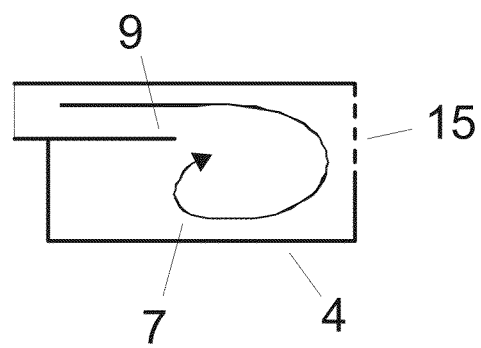
FIG. 4 shows a collecting container with a turbulent air steam.

FIG. 4 shows a collecting container 4 where the air is guided over an edge 9 to generate turbulences in the air stream, as shown by arrow 7. In general, turbulence may be caused by a stall of an air stream along a vane at the end of the vane. The air can exit the collecting container through the holes 15 which may be covered by a filter (not shown in FIG. 4), as described in more detail below. The turbulence causes the air to drop dust particles into the collecting container. This effect can be improved by gravity. Once the dust particles are flung out of the main turbulent air stream, the particles are slowed down and collected in traps (not shown in FIG. 4). These traps either consist of vanes or porous material, which keeps out the turbulent air to avoid a further dispersion of dust.

In the embodiments described herein, the cover 5 or protective casing is placed around the sites of the sliding contact assembly in which abraded matter is produced and scattered. These sites are the surfaces of contact between the brush contact members 1 and the contact tracks 2, and the space on the downstream side of the surfaces of contact between the brush contact members 1 and the contact tracks 2. When a contact track 2 is moving relative to a brush contact member 1, the abraded matter is ejected into surrounding space mainly along the direction of arrows 7, as shown in FIGS. 1 and 3. The collecting container 4 is positioned downstream of the points of contact between the brush contact members 1 and the contact track 2 to capture the abraded matter.

When the contact track 2 moves rapidly, as is the case in slip rings used in computer tomographs, it creates an air stream moving along above the surface of the track 2. The cover 5 used in accordance with the sliding contact assembly of the present invention acts as an air-guiding channel to guide the air stream which carries particles of material abraded from the brush contact member 1 into the collecting container 4, and therefore, reduces the amount of contamination scattered into the surroundings of the sliding contact assembly. The creation of an air stream by movement of the track 2 may be promoted, in one embodiment, by providing suitably shaped vanes 12 (shown only on the left-hand side of FIG. 3) at intervals along lateral edge-portions of the track 2.

In one embodiment, means are provided (e.g., within block 20 of FIG. 3) for producing an excess pressure of air inside an upstream end of the cover 5. It is possible to increase the air stream through the cover 5 by creating an air-pressure in excess of atmospheric pressure inside the cover 5 on the upstream side of the brush contact members 1, for example, by introducing pressurized air from the means included within block 20 through a supply pipe 8. In one embodiment, the means provided within block 20 may include a fan or blower for generating a stream of air to pass through the cover 5. Alternatively, means may be provided (e.g., within block 22 of FIG. 3) for producing a sub-pressure of air in the collecting container 4. For example, suction can be applied on an outlet side of the collecting container 4 via the means included within block 22. This can result in a more effective removal of particles of abraded matter.

It is expedient to channel the air current in the direction of the collecting container 4 with the aid of suitably placed air-guiding plates 10, examples of which are shown in the embodiment of FIG. 3.

In one embodiment, the cover 5 may be made of sheet metal when a high electrical conductivity of the cover material can be tolerated. In this case, it could also serve as an electrical shield or screen. Furthermore, a conductive surface helps to reduce electrostatic charging. For this purpose, the surface Resistance is preferably between 1 kOhm and 10 MegOhm. This prevents electrostatic attraction of dust to the cover surface before it reaches the filter (included, e.g., within block 22). Alternatively, the cover could be formed from an insulating material, such as plastic sheeting. Both features can be obtained by using an insulating material having a conductive surface coating.

The brush holder 3 may be a part of the cover 5 (FIG. 3) or may be enclosed therein (FIG. 1). The inside walls of the cover 5 and any air-guiding plates 10 (FIG. 3) should be designed to have no sharp edges or undercut portions where abraded dust can collect. The air-guiding plates 10 may be positioned to deflect air streams away from inside corners of the cover 5. Inside surfaces of the cover 5, air guiding plates 10, collecting container 4 and the support of contact slide tracks may be provided with an anti-adhesive coating, like micro- and nano-particles resulting in a lotus-effect. Furthermore, at least one edge (not shown) may be provided within the cover 5 to generate a turbulent air flow. Such turbulences can help to remove dust particles adhering at any surface of the contact track 2 or its support 11 or any brush contact member 1. A cover 5 made of conductive material or with a conductive surface may also be used as electrical or electromagnetic shield.

The collecting container 4 is a dust filter mounted onto the downstream end of the cover 5 and permitting a passage of air through a filter medium (included, e.g., within block 22 of FIG. 3). It may be designed to be an electrostatic dust filter, an electret filter or it may comprise any one of these filters. In another embodiment, the collecting container 4 may comprise some dust-attracting material, like cloth or plush. Furthermore, the collecting container 4 may comprise a dust collection bag (included, e.g., within block 22 of FIG. 3), like a vacuum cleaner bag. The bag or the filter is preferably contained in an exchangeable cartridge. This cartridge can be conveniently exchanged and/or cleaned. In addition, the collecting container 4 may be provided with an anti-adhesive coating, like micro- and nano-particles resulting in a lotus-effect, or any of the materials and surfaces as described above for the cover. In another embodiment, the collecting container comprises a deflector for deflecting the air stream inside the collecting container and improving disposal of dust or particles within the collecting container.

In a further embodiment of the invention, hatches or vanes are provided for redirecting the air stream in accordance with the direction of rotation. Furthermore the air stream generated by the rotating member may be used for blowing air into the collecting container and for suction of air out of the collecting container. Preferably, the bottom of the collecting container is covered by a porous material, like Polyurethane foam, to absorb particles.

Another embodiment of the invention comprises means for adapting the air flow actively or passively in dependence of the contact slide track rotational direction by actively or passively adapting vanes, vents, a fan direction or an additional filter. Therefore the air flow into or through the filter is maximized dependent of the rotational direction to obtain optimum particle removal characteristics.

The invention claimed is:

1. Sliding contact assembly comprising:
   at least one contact slide track;
   a brush holder for holding at least one brush contact member and maintaining the at least one brush contact member in sliding contact with the at least one contact slide track during relative movement between the brush contact member and the contact slide track;
   a cover configured to surround only the brush holder and the at least one brush contact member, such that only the brush holder and the at least one brush contact member are enclosed within walls of the cover;
   a collecting container disposed at a downstream end of the cover to collect particles of abraded material from the at least one brush contact member; and
   wherein the cover is designed to channel a stream of air, generated within the cover by movement of the contact slide track, towards the collecting container, and wherein the cover is made of a conductive material or with a conductive surface coating, which prevents electrostatic charging.

2. Sliding contact assembly according to claim 1, wherein means are coupled to the cover for producing an excess pressure of air inside an upstream end of the cover.

3. Sliding contact assembly according to claim 1, wherein means are coupled to the collecting container for producing a sub-pressure of air in the collecting container.

4. Sliding contact assembly according to claim 1, wherein a blower is coupled to an upstream end of the cover to generate an additional air stream passing through the cover from the upstream end to a downstream end of the cover.

5. Sliding contact assembly according to claim 1, wherein at least one air-guiding plate is provided inside the cover to channel the stream of air in a direction towards the collecting container.

6. Sliding contact assembly according to claim 5, wherein at least one of the inside surfaces of the cover, the air guiding plates, the collecting container and a support of the contact slide tracks is provided with an anti-adhesive coating, like micro- and nano-particles.

7. Sliding contact assembly according to claim 5, wherein at least one of the inside surfaces of the cover, the air guiding plates, the collecting container and a support of the contact slide tracks is provided with a conductive surface coating which prevents electrostatic charging.

8. Sliding contact assembly according to claim 1, wherein the collecting container is a dust filter adapted to be fitted onto a downstream end of the cover.

9. Sliding contact assembly according to claim 8, wherein the collecting container comprises an electrostatic dust filter.

10. Sliding contact assembly according to claim 8, wherein the collecting container comprises an electret filter.

11. Sliding contact assembly according to claim 1, wherein the collecting container comprises a dust collection bag.

12. Sliding contact assembly according to claim 1, wherein the collecting container comprises an exchangeable dust collection cartridge.

13. Sliding contact assembly according to claim 1, wherein said collecting container comprises means to generate a turbulent air stream causing the air stream to drop abraded particles into the collecting container.

14. Sliding contact assembly according to claim 1, wherein said collecting container comprises means to generate a turbulence caused by a stall of an air stream along a vane at the end of the vane causing the air stream to drop abraded particles into the collecting container.

15. Sliding contact assembly according to claim 1, wherein the air flow is actively or passively adapted in dependence of the contact slide track rotational direction by actively or passively adapting vanes, vents, a fan or a filter.

16. Sliding contact assembly according to claim 1, wherein vanes are provided at intervals along lateral edge-portions of the contact slide track to promote a generation of an air stream through the cover.

17. Sliding contact assembly according to claim 1, wherein a plurality of adjacent parallel contact slide tracks are provided, and wherein the brush holder is adapted to accommodate a plurality of contact brush members, at least one contact brush member being provided for maintaining contact with a respective one of the contact slide tracks.

18. Sliding contact assembly according to claim 1, wherein the walls of the cover extend along a direction of the contact slide track laterally of the brush holder and the brush contact member and along a side of the brush holder remote from the contact slide track.

* * * * *